(12) United States Patent
Wang et al.

(10) Patent No.: US 7,401,514 B2
(45) Date of Patent: Jul. 22, 2008

(54) ASYMMETRIC TORSION BALANCE GRAVIMETER

(75) Inventors: Lijun Wang, Möhrendorf (DE); Felix Müller, Rügland (DE); Bruno Menegozzi, Erlangen (DE)

(73) Assignees: Friedrich-Alexander-Universitat at Erlangen-Nurnberg, Erlangen (DE); Max-Planck-Gesellschaft zur Forderung der Wissenschaften e.V., Munich (DE)

(*) Notice: Subject to any disclaimer, the term of this patent is extended or adjusted under 35 U.S.C. 154(b) by 320 days.

(21) Appl. No.: 11/148,474

(22) Filed: Jun. 8, 2005

(65) Prior Publication Data

US 2006/0277993 A1    Dec. 14, 2006

(51) Int. Cl.
*G01M 1/12* (2006.01)
(52) U.S. Cl. .................................................. 73/383
(58) Field of Classification Search ............... 73/383
See application file for complete search history.

(56) References Cited

U.S. PATENT DOCUMENTS

| | | | | |
|---|---|---|---|---|
| 1,774,516 A | * | 9/1930 | Kilchling | 73/383 |
| 1,843,342 A | * | 2/1932 | Shaw et al. | 73/383 |
| 1,963,252 A | * | 6/1934 | Truman | 73/383 |
| 3,722,290 A | * | 3/1973 | Weber et al. | 73/382 R |

OTHER PUBLICATIONS

Adelberger, E. et al, "Testing the Equivalence Principle in the Field . . . ," Physical Review D, The American Physical Society, Nov. 15, 1990, pp. 3267-3292, vol. 42, No. 10.
Baebler, S. et al, "Improved Test of the Equivalence Principle . . . ," Physical Review Letters, The American Physical Society, Nov. 1, 1999, pp. 3585-3588, vol. 83, No. 18.
Bantel, M. et al, "A Cryogenic Torsion Pendulum: Progress Report," Class. Quantum Grav. 17 (2000) pp. 2313-2318, IOP Publishing Ltd., Printed in the UK.
Braginsky, V. et al, "Verification of the Equivalence of Inertial and Gravitational Mass," JETP vol. 34, No. 3, 463-466 American Institute of Physics, Mar. 1972.
Dorobantu, R., "Gravitationsdrehwaage," IAPG/FESG, No. 4, pp. 1-44, Technische Universitat Munchen, Munchen 1999.
Gundlach, J. et al, "Measurement of Newton's Constant Using a Torsion . . . ," Physical Review Letters, The American Physical Society, Oct. 2, 2000, pp. 2869-2872, vol. 85, No. 14.
Lamoreaux, S., "Demonstration of the Casimir Force in the 0.6 . . . ," Physical Review Letters, The American Physical Society, Jan. 6, 1997, pp. 5-8, vol. 78, No. 1.
Lorrain, P.: "An Optical Lever for Measuring Very Small Rotational Oscillations," Optics and Lasers in Engineering 15 (1991), 197-201.

(Continued)

*Primary Examiner*—Robert R Raevis
(74) *Attorney, Agent, or Firm*—Gallagher & Kennedy, P.A.; Thomas D. MacBlain

(57) ABSTRACT

The invention relates to a gravity measurement apparatus comprising a torsion balance bearing a test mass. The torsion balance has a predetermined center of mass and is rotatable around a predetermined rotation axis, wherein the torsion balance is asymmetric in such a way that the center of mass of the torsion balance is offset to the rotation axis of the torsion balance.

24 Claims, 9 Drawing Sheets

OTHER PUBLICATIONS

Newman, R. et al, "On Determining G Using a Cryogenic Torsion Pendulum," Meas. Sci. Technol. 10 (1999) 445-453, IOP Publishing Ltd., Printed in the UK.

Peters, R., "Mechanically Adjustable Balance and Sensitive Tilt Meter," Meas. Sci. Technol. 1 (1990) 1131-1135, IOP Publishing Ltd., Printed in the UK.

Richman, S. et al, "Preliminary Determination of G Using the BIPM Torsion Strip Balance," Meas. Sci. Technol. 10 (1999) 460-466, IOP Publishing Ltd., Printed in the UK.

Smith, G. et al, "Short-range Tests of the Equivalence Principle," Physical Review D, 1999 The American Physical Society, Feb. 2001, pp. 1-20, vol. 61.

Zhou, A. et al, "On the Significance of Electrical Damping in Torsion Balance," Chinese Physics Letters vol. 14, No. 8 (1997) 565-568.

* cited by examiner

ASYMMETRIC TORSION BALANCE GRAVIMETER

FIELD OF THE INVENTION

The invention relates to a gravity measurement apparatus, and more particularly to apparatus suitable for precision surveillance of the gravitational field of the earth, mapping of local changes in gravitational gradients (e.g. for the search for mineral deposits) or mapping of variations in tidal forces (in climate and geographic research).

BACKGROUND

For a long time, it is well known in the state of the art to use torsion balances to measure gravity forces. These torsion balances are disclosed, for example, in Dorobantu, R.: "Gravitionsdrehwaage," IAPG/FESG No. 4, 1999. They comprise a horizontal balance beam, which is suspended from a torsion wire defining a rotation axis. The balance beam bears two test masses on opposite sides of the torsion wire so that the torsion balance is symmetric and the center of mass of the torsion balance is in line with the rotation axis of the torsion balance. Therefore, these conventional symmetric torsion balances compensate for the gravitational attraction g of the earth, so that differential forces can be determined using the so-called "Null measurements" (e.g. tests of the "equivalence principle" as disclosed in SMITH et al.: "Short-range tests of the equivalence principle," Physical Review D, Volume 61, 022001, 1999). The advantage of these conventional symmetric torsion balances is their very high precision with relative accuracies down to $10^{-13}$ (cf. SMITH et al.). However, the conventional symmetric torsion balances merely allow the measurement of differential forces, whereas the measurement of absolute values of gravity forces is not possible.

Further, symmetric torsion balances with more complex mass distributions (quadrupole or octupole) are known from V. B. BRAGINSKY, V. I. PANOV: "Verification of the equivalence of inertial and gravitational mass", JETP 34, 463 (1972). These torsion balances are commonly used for eliminating certain orders of gravitational fields.

Therefore, it is an object of the invention to provide a gravity measurement apparatus allowing the measurement of absolute values of gravity forces.

Further, it is an object of the invention to combine the high precision of the aforementioned symmetric torsion balances with the possibility to measure absolute values of gravity forces.

SUMMARY

These and other objects are achieved by a gravity measurement apparatus comprising a torsion balance bearing a test mass, said torsion balance having a predetermined center of mass and being rotatable around a predetermined rotation axis, wherein the torsion balance is asymmetric in such a way that the center of mass of the torsion balance is shifted relative to the rotation axis of the torsion balance. In other words, the torsion balance does not have a symmetric mass distribution as the aforementioned symmetric torsion balances according to the state of the art. Instead, the torsion balance according to the invention comprises a torsion balance having an asymmetric mass distribution with regard to the rotation axis, so that absolute value measurements of gravity forces are possible. Therefore, the torsion balance of the invention preferably comprises a single test mass only.

The gravity measurement apparatus according to the invention is particularly suitable for the measurement of varying gravity forces with long periods such as gravitational interaction between the gravity measurement apparatus and cosmic objects (e.g. the sun). However, the gravity measurement apparatus according to the invention can be used in a variety of tasks, e.g. precision surveillance of the gravitational field of the earth, mapping of local changes in gravitational gradients (e.g. in the search for mineral deposits) or mapping of variations in tidal forces (e.g. in climate and geographic research).

Unlike the aforementioned well-known symmetric torsion balances, the inventive asymmetric torsion balances does not inherently compensate for the gravitational attraction g of the earth. Instead, the gravitational attraction g of the earth is preferably compensated by an electrostatic feedback device for applying an electrostatic feedback force to the torsion balance.

The electrostatic feedback device preferably comprises at least a first feedback electrode attached to the torsion balance for applying the electrostatic feedback force to the torsion balance. With regard to the rotation axis of the torsion balance the first feedback electrode is preferably arranged opposite the test mass so that the electrostatic feedback force causes a torque acting on the torsion balance for compensating the gravitational attraction g of the earth.

The axis of the torque generated by the first feedback electrode is preferably aligned perpendicular to the rotation axis of the torsion balance and also perpendicular to the longitudinal axis of the torsion balance. Therefore, the torque generated by the first feedback electrode compensates the asymmetric mass distribution of the torsion balance so that the torsion balance is kept horizontal.

Further, the first feedback electrode is preferably flat and aligned perpendicular to the rotation axis of the torsion balance so that the electrostatic feedback force acting on the first feedback electrode is aligned parallel to the rotation axis of the torsion balance.

In the preferred embodiment of the invention the electrostatic feedback device comprises a set of second feedback electrodes attached to the torsion balance, said second feedback electrodes being flat and aligned perpendicular to each other and parallel to the rotation axis of the torsion balance. Therefore, the second feedback electrodes can be used to apply a rotational feedback torque on the torsion balance with regard to the rotation axis of the torsion balance.

Further, the second feedback electrodes can be used for damping movements of the torsion balance. Particularly, common swinging pendulum modes and rotational oscillatory modes can be damped by the second feedback electrodes.

Further, the first and second feedback electrodes are preferably driven by capacitors into which the first and second feedback electrodes extend so that the electrical field within the capacitors acts on the first and second feedback electrodes causing the electrostatic feedback forces. Therefore, the capacitors are preferably aligned parallel to the first and second feedback electrodes.

The aforementioned feedback mechanism of applying a feedback voltage to a feedback capacitor is illustrated in Z. ZHOU, J. LUO: "On the significance of electrical damping in torsion balance", Chinese Physics Letters Vol. 14, No. 8 (1997) 565, so that this publication is incorporated herein by reference.

In the preferred embodiment the first and second feedback electrodes at least partially consist of glass plates, which can be covered with an electrically conducting material (e.g. metals such as gold).

Further, it should be noted that the invention is not restricted to a gravity measurement apparatus comprising an electrostatic feedback device. Instead of the electrostatic feedback device a magnetic feedback device or any other type of force feedback devices can be used for compensating for the gravitational attraction g of the earth and for damping oscillatory movements of the torsion balance.

In the preferred embodiment of the invention, the torsion balance is arranged within a Faraday cage shielding the torsion balance at least partially from electrostatic disturbances. The Faraday cage can be realized by a box consisting of an electrically conductive material (e.g. aluminium).

Further, the gravity measurement apparatus according to the invention preferably comprises a magnetic cage shielding the torsion balance at least partially from magnetic disturbances. The magnetic cage can be realized by encasing the torsion balance by so-called µ-metal foil with a high magnetic permeability.

In the preferred embodiment the gravity measurement apparatus according to the invention further comprises a thermal insulation shielding the torsion balance at least partially from thermal disturbances.

Moreover, the gravity measurement apparatus preferably comprises a vacuum chamber encasing the torsion balance, so that thermal gradients and residual air pressure in the vicinity of the torsion balance are further reduced.

Further, the gravity measurement apparatus according to the invention preferably comprises an optical readout device for detecting the position of the torsion balance, particularly the angular position of the torsion balance.

The optical readout device preferably comprises a first mirror and a second mirror, said first mirror and said second mirror being attached to the torsion balance and being aligned perpendicular to each other and parallel to the rotation axis.

Further, the optical readout device preferably further comprises a first light source directing a first light beam onto the first mirror, a first light detector detecting the first light beam after its reflection by the first mirror, a second light source directing a second light beam onto the second mirror and a second light detector detecting the second light beam after its reflection by the second mirror. Therefore, the first and second light beams are being reflected by the first and second mirrors attached to the torsion balance. These light beams are preferably aligned perpendicular to each other.

The first and second light detectors are preferably four quadrant photo detectors (e.g. four quadrant photo diodes), so that movements of the suspended torsion balance can be tracked in any allowed translational or rotational degree of freedom.

Further, the optical readout device preferably applies the so-called "lock-in technique" for improving the signal-to-noise ratio of the measurement. Therefore, the optical readout device preferably comprises a lock-in amplifier receiving as one input an electrical measurement signal from the light detectors and as a second input a frequency reference, which is also used to modulate the light beams by a modulator, e.g. by means of AOM (Acousto-optical modulation). Therefore, the modulator is preferably an acousto-optical modulator. However, it is also possible to use an EOM (Electro-optical modulator) or other types of optical modulators.

Sending the electrical measurement signal generated by the light detectors to the same lock-in amplifier as the frequency reference used for modulation of the light beams generates a DC (direct current) signal out of exactly one frequency component of the detected electrical measurement signal. Now one assumes that the electrical measurement signal contains a lot of disturbing influences with a variety of different frequency components. Therefore, the optical readout device preferably comprises a bandpass filter filtering the electrical measurement signal before its amplification by the lock-in amplifier.

The bandpass filter preferably comprises a centre frequency corresponding to the frequency reference used for modulation of the light beams which supports the aforementioned lock-in technique.

The aforementioned optical readout device is also disclosed in PAUL LORRAIN: "An optical lever for measuring very small rotational oscillations", Optics and Lasers in Engineering 15 (1991), 197-201. Therefore, the content of this publication is incorporated by reference herein.

The torsion balance is preferably suspended from a torsion wire or a torsion strip as a supporting torsion member as in conventional symmetric torsion balances. The torsion wire or the torsion strip preferably consists of tungsten, silver, copper, platinum or iridium. However, the torsion wire may also consist of quartz fibers with a metal coating. Further, the torsion wire preferably has a diameter between 5 µm and 50 µm. In principle, larger diameters of the torsion wire are possible. However, this would decrease the sensitivity of the torsional motion. The diameter of the torsion balance can be tuned in a wide range for many applications. In some cases it might even be useful to decrease the sensitivity deliberately in order to reduce certain noise components.

The torsion strip for suspension of the torsion balance is disclosed, for example, in RICHMAN et al.: "Preliminary determination of G using the BIPM torsion strip balance", Meas. Sci. Technol. 10 (1999) 460-466. Therefore, this publication is incorporated by reference herein.

The torsion wire or the torsion strip preferably consist of an electrically conductive material so that the torsion balance can be electrically grounded by the torsion wire or the torsion strip.

It may be desirable to include in combination with an electrostatic feedback device a magnetostatic feedback for compensation of vertical movements of the torsion balance along the rotation axis.

Further, the torsion balance preferably comprises a main structure (e.g. a rod) being aligned coaxially with the rotation axis and being suspended from the wire. In a preferred embodiment of the invention the main structure is constructed from a solid vertical aluminium body having a quadratic cross section. Further, the torsion balance may comprise a horizontal secondary structure (e.g. a stick or beam) bearing the test mass on one end and the first feedback electrode on the opposite end, wherein said secondary structure is attached to the main structure and being aligned perpendicular to the rotation axis of the torsion balance.

The torsion balance is preferably electrically grounded to avoid any electrostatic disturbances, e.g. by the torsion wire itself. Therefore, the torsion balance preferably consists of an electrically conductive material (e.g. aluminium). Alternatively, the torsion balance might be coated with an electrically conductive coating. In the latter case the torsion balance might even consist of an electrically insulating material. For example, the torsion balance might consist of glass having a golden coating.

Further, the torsion balance preferably consists of a non-magnetic material (e.g. aluminium) to avoid any magnetic disturbance.

Other features and advantages of the invention will become apparent from the following description of a preferred exemplary embodiment considered with the accompanying drawings.

DETAILED DESCRIPTION

Figure 1A:
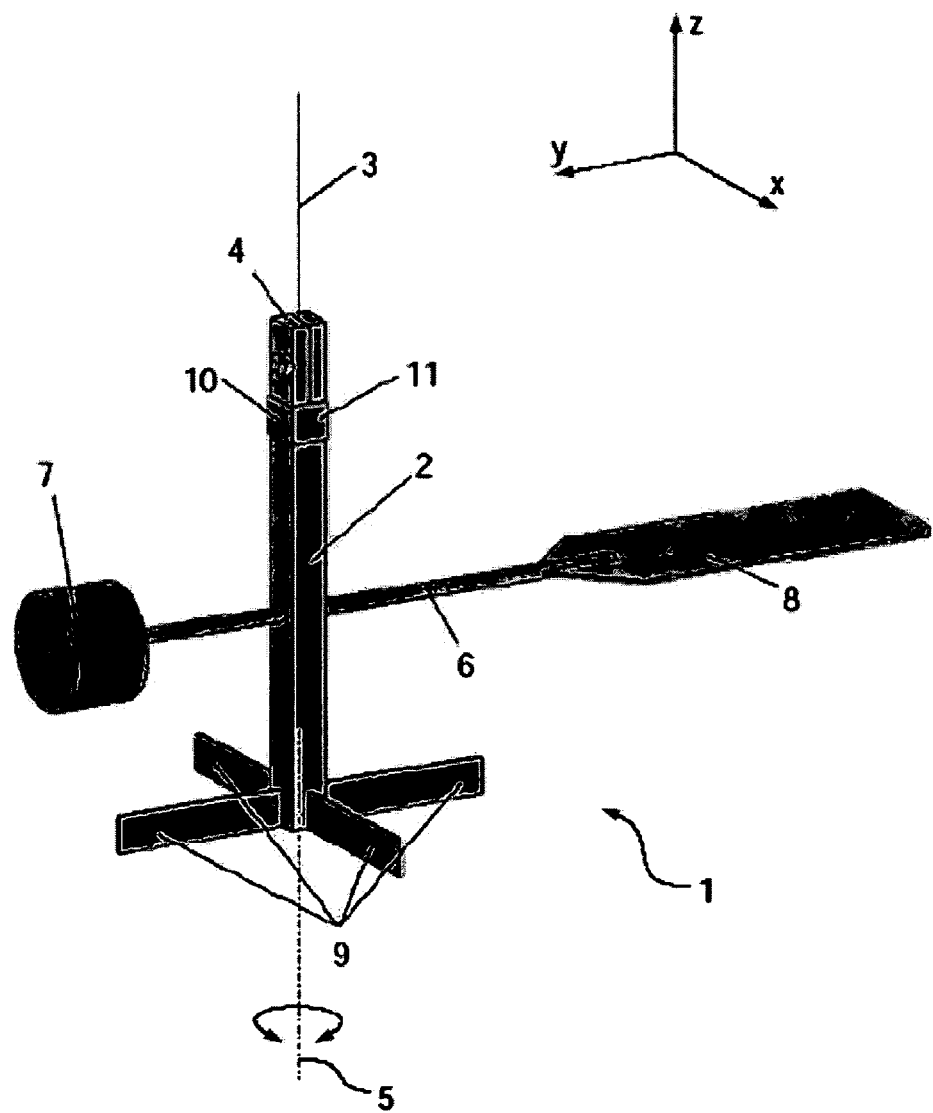
FIG. 1A shows a perspective view of a torsion balance according to the invention.
Figure 1B:
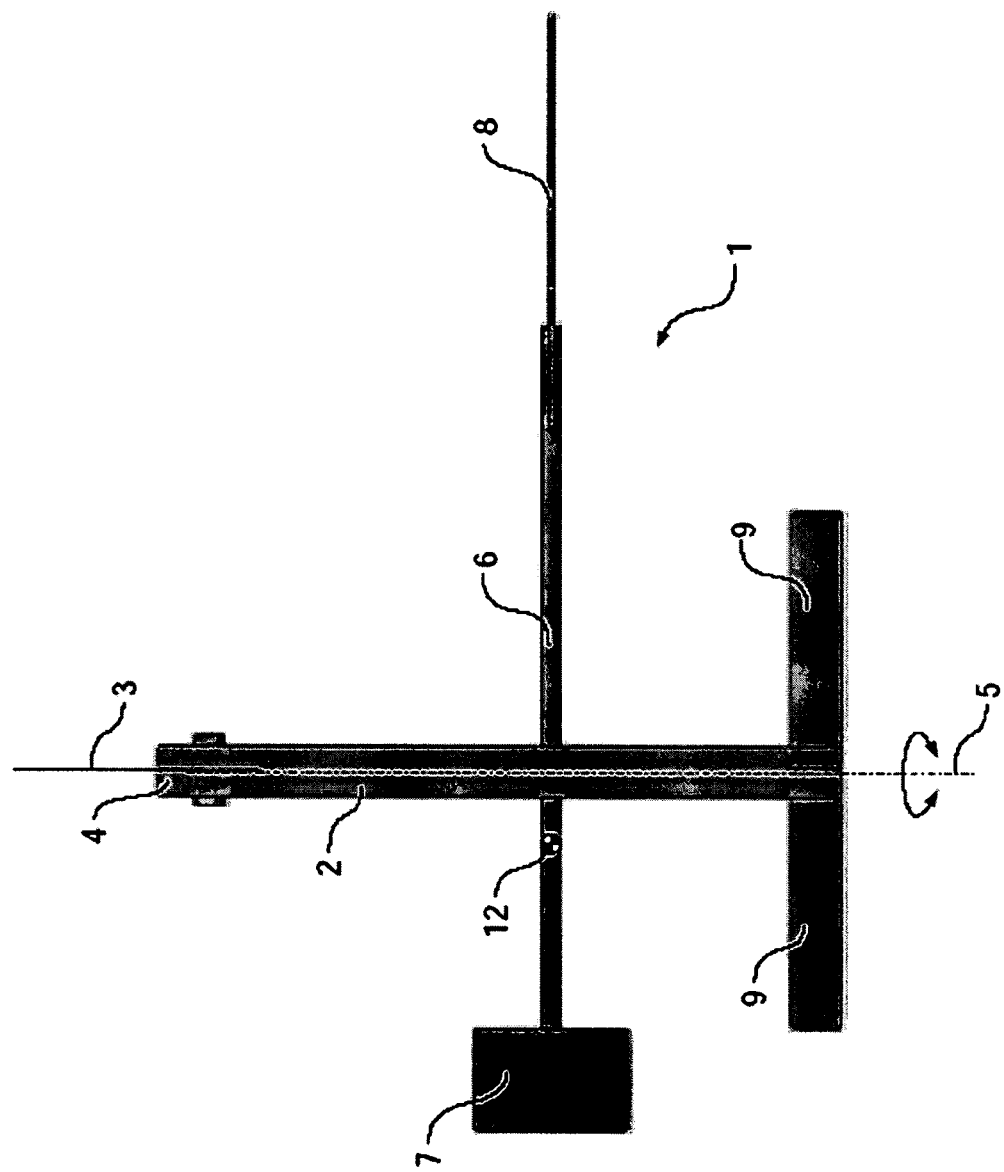
FIG. 1B shows a side view of the torsion balance according to FIG. 1A.

FIGS. 1A and 1B illustrate an asymmetric torsion balance 1 comprising a vertical alninium rod 2 which is suspended from a torsion wire 3 at its top 4. The torsion wire 3 has a diameter of 25 μm and consists of tungsten. Further, the torsion wire 3 defines a rotation axis 5 of the torsion balance 1, so that the torsion balance 1 can rotate around the rotation axis 5.

Further, a horizontal beam 6 is fixed along the middle of the vertical rod 2. On one side of the beam 6 a single test mass 7 is attached, and on the other side of the beam 6 a first feedback electrode 8 is attached for applying an electrostatic feedback force to the torsion balance 1, which will be described later.

At the bottom of the vertical rod 2 a set of second electrodes 9 is attached, which are aligned perpendicular to each other and parallel to the rotation axis 5 of the torsion balance 1. Therefore, the second feedback electrodes 9 can be used to apply a rotational feedback torque on the torsion balance 1 with regard to the rotation axis 5. Further, the second feedback electrodes 9 can be used for damping movements of the torsion balance 1. Particularly, common swinging pendulum modes and rotational oscillatory modes can be damped by the second feedback electrodes 9.

Further, a first mirror 10 and a second mirror 11 (see FIG. 1A) are attached to the side surfaces of the vertical rod 2 near the top 4. The first and second mirrors 10, 11 are part of an optical readout device, which is used to determine the angular position of the torsion balance 1 and which will be described later.

It is an essential feature of the torsion balance 1 that it comprises an asymmetric mass distribution so that it allows the measurement of absolute values of gravity forces. Therefore, 10 the torsion balance 1 comprises a center of mass 12 (see FIG. 1B), which is shifted horizontally with regard to the rotation axis 5 of the torsion balance 1.

Referring to the coordinate system illustrated in FIG. 1A there are the following degrees of freedom for the torsion balance 1:

Translatory movements along x-axis and y-axis;
Rotary movements around x-axis and z-axis (rotation axis 5).

However, rotational motions around the y-axis are suppressed due to the geometrical symmetry of the torsion balance 1 in this degree of freedom. Further, translational movements along the z-axis are forbidden due to the suspension of the torsion balance 1 and the attraction of the torsion balance 1 by the gravitational attraction of the earth.

Figure 2:
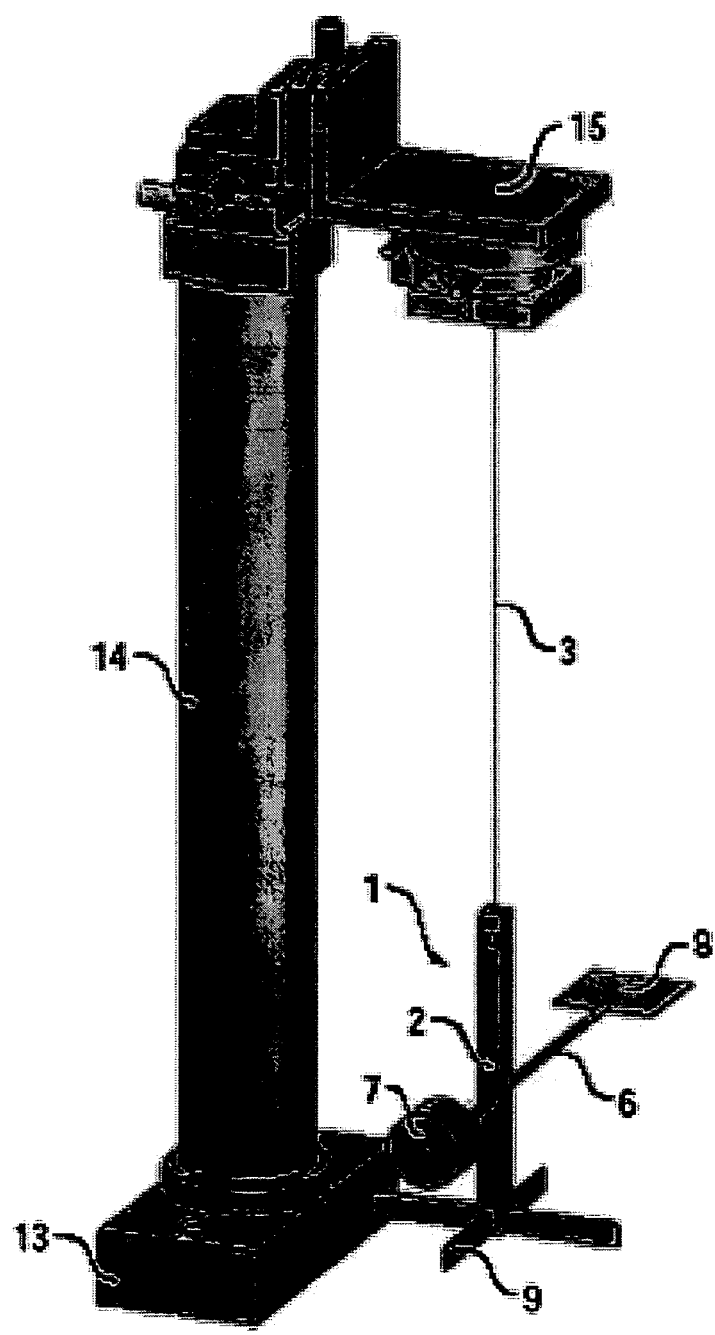
FIG. 2 is a perspective view showing the torsion balance suspended from a torsion wire.

FIG. 2 illustrates the suspension of the torsion balance 1 in the gravity measurement apparatus according to the invention. Therefore, the gravity measurement apparatus according to the invention comprises a base 13 supporting a vertical column 14. At the top of the column 14 there is a horizontal arm 15 to which the torsion wire 3 is attached. The arm 15 can be moved freely to position the torsion balance 1 precisely.

Figure 3:
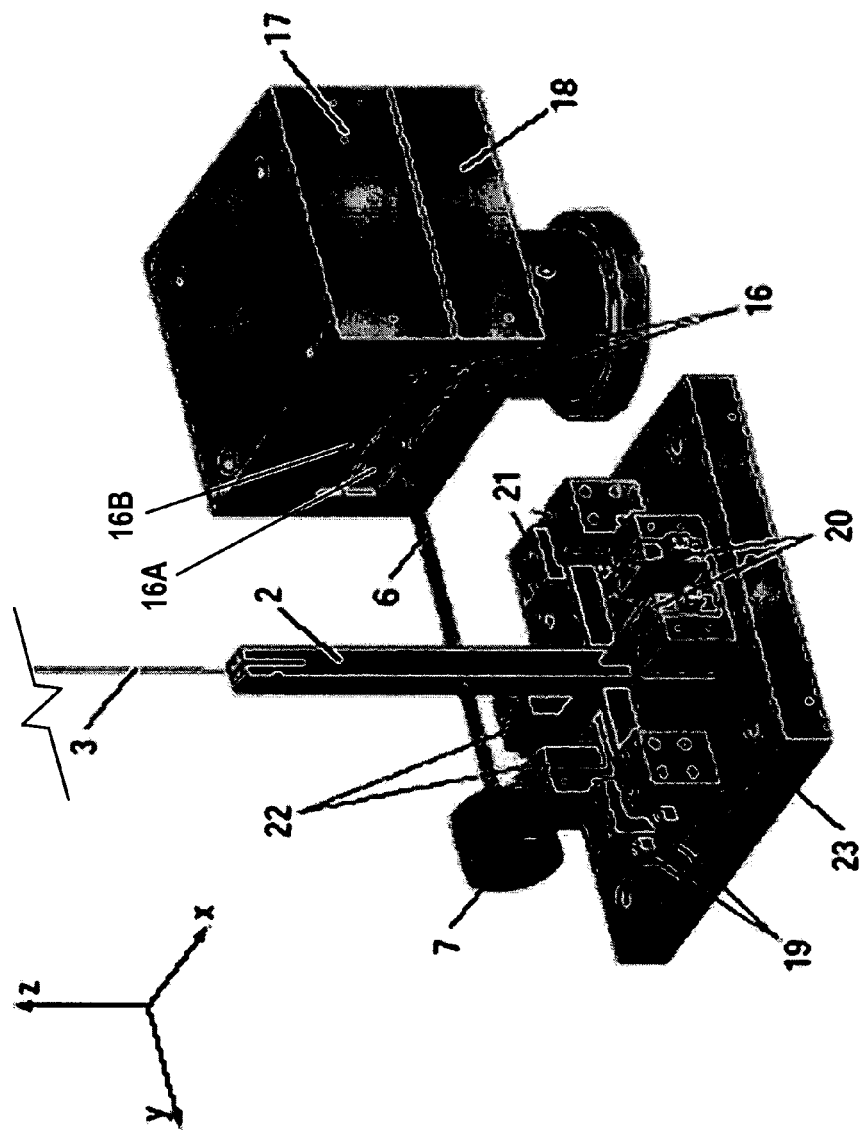
FIG. 3 is a perspective view of the torsion balance and an electrostatic feedback device for compensating the gravitational attraction of the earth and for damping oscillatory movements of the torsion balance.

FIG. 3 illustrates the aforementioned electrostatic feedback device, which will be explained in the following.

The electrostatic feedback device comprises a first capacitor 16 having flat and horizontally aligned parallel capacitor plates 16A and 16B, wherein the first capacitor 16 is encapsulated by a housing consisting of an upper part 17 and a lower part 18. The capacitor 16 applies an electrostatic feedback force to the first feedback electrode 8 of the torsion balance 1 along the z-axis. The electrostatic feedback force caused by the capacitor 16 is used for compensating the gravitational attraction g of the earth.

Further, the electrostatic feedback device comprises a set of second capacitors 19, 20, 21 and 22, which are mounted on a base plate 23. The second capacitors 19-22 are aligned parallel to the rotation axis 5 defined by the torsion wire 3 and perpendicular to each other. Therefore, the second capacitors 19-22 apply a torque to the torsion balance 1 with regard to its rotation axis 5. The torque caused by the second capacitors 19-22 can be used for damping oscillatory rotary motions of the torsion balance 1 with regard to its rotation axis 5 and pendulum swinging modes. Further, the second capacitors 19-22 can be used to apply a rotational feedback to the torsional balance 1 after the initial oscillatory rotational movements of the torsion balance 1 have disappeared due to the afore-mentioned damping.

The first capacitor 16 and the second capacitors 19-22 can be driven independently from each other with different voltages by a computer control which is based on PID (Proportional-Integral-Differential) controllers for each input channel. The feedback signal consists of a constant (offset) part and additional small voltage outputs fed to the first capacitor 16 and the second capacitors 19-22. Therefore, motions in all degrees of freedom can thus be compensated for.

Figure 4:
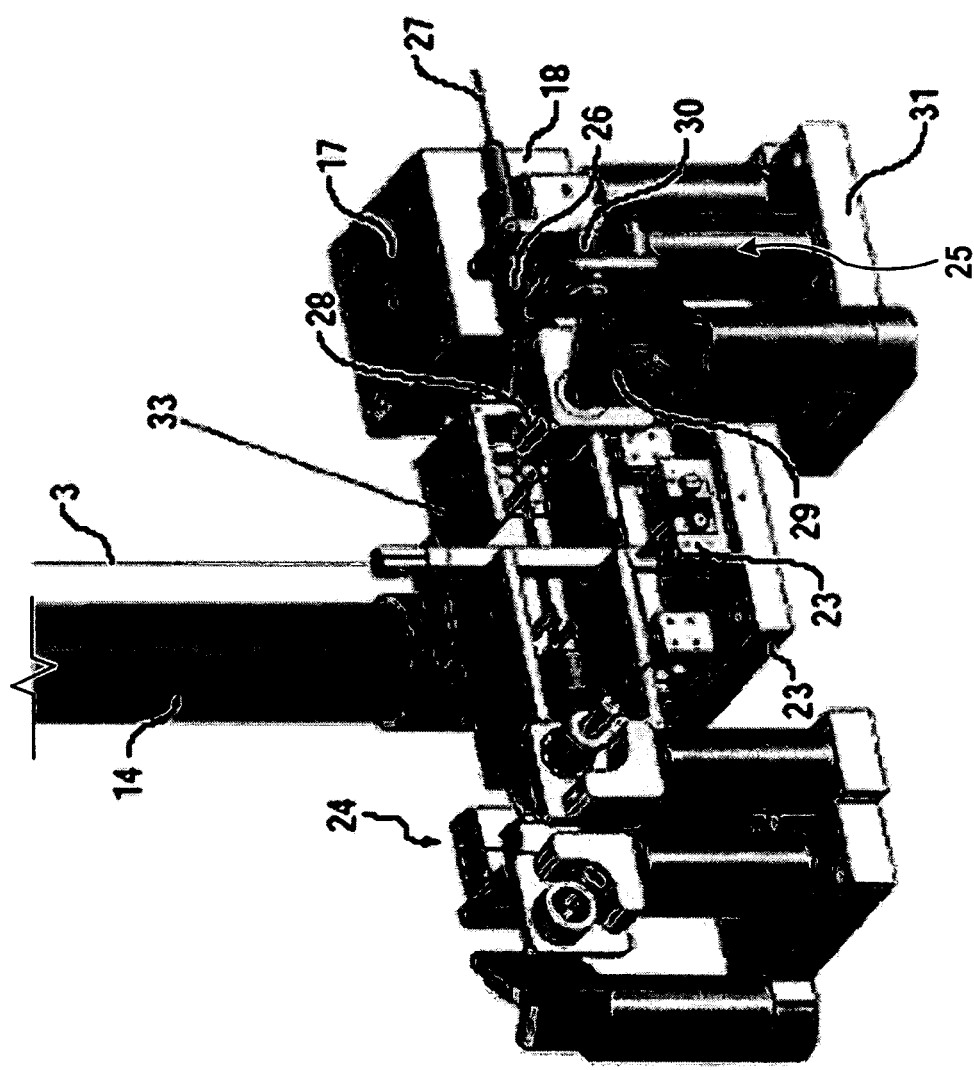
FIG. 4 is a perspective view showing the torsion balance, the electrostatic feedback device and an optical readout device for detecting the position of the torsion balance.
Figure 5:
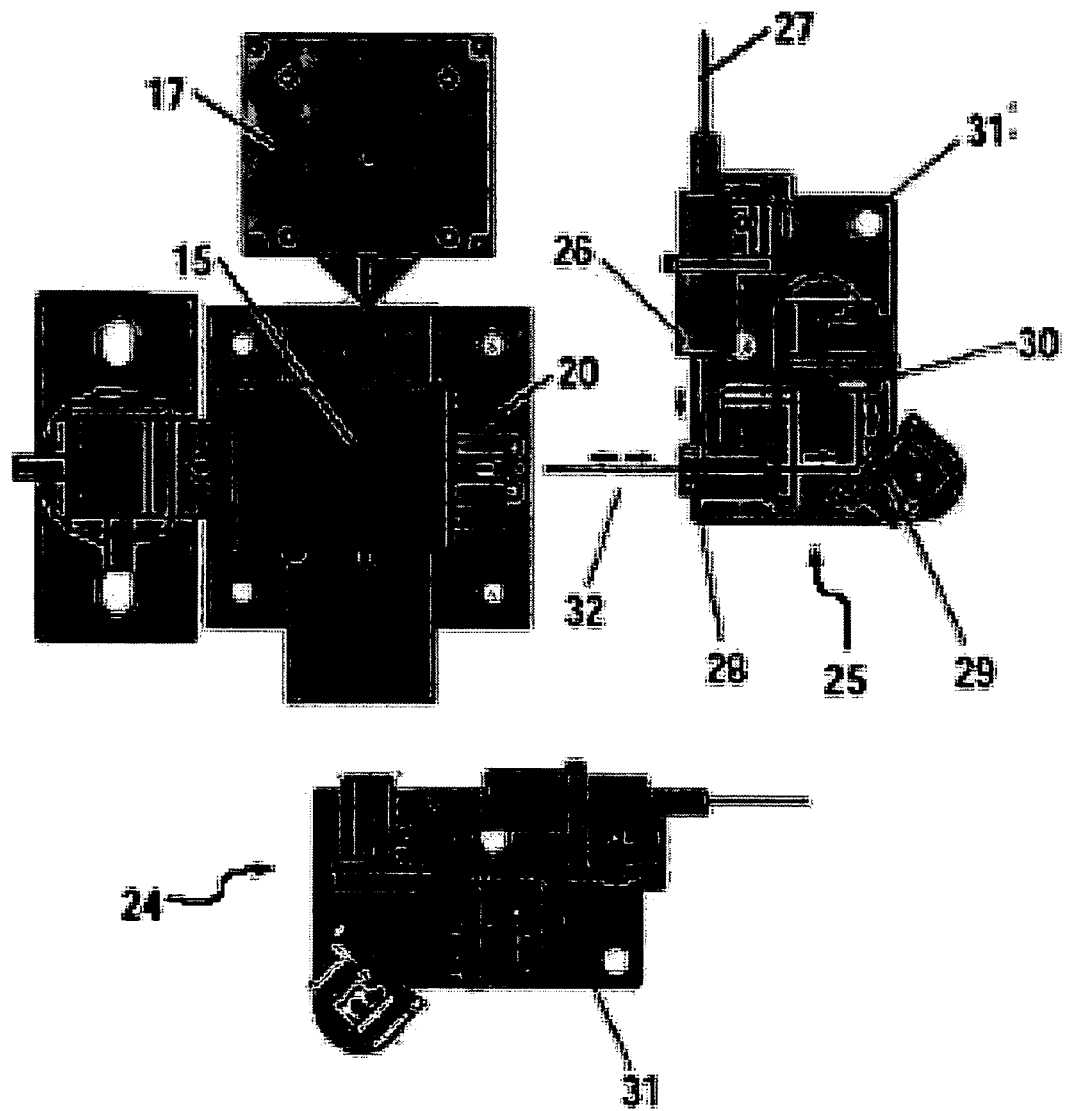
FIG. 5 is a top view of the gravity measurement apparatus showing the optical readout device and the electrostatic feedback device.

FIGS. 4 and 5 illustrate an optical readout device for detecting the angular position of the torsion balance 1 with regard to the degrees of freedom mentioned above.

The optical readout device comprises a first optical module 24 and a second optical module 25, which have an identical design, so that in the following the optical module 25 is illustrated only.

The second optical module 25 of the optical readout device comprises a fiber outcoupler 26 connected to an optical fiber 27 through which an optical signal is fed to the fiber outcoupler 26.

Further, the second optical module comprises a beamsplitter cube 28, a mirror 29 and a four quadrant photo diode detector 30.

The fiber outcoupler 26, the beamsplitter cube 28, the mirror 29 and the detector 30 are mounted on a base plate 31, as can be seen in FIG. 4.

The fiber outcoupler 26 couples a light beam out of the optical fiber 27 and the beamsplitter cube 28 directs a light beam 32 onto the second mirror 11 (FIG. 1A) of the torsion balance 1. The light beam 32 is reflected by the second mirror 11 of the torsion balance 1 and the mirror 29 of the second optical module 25 of the optical readout device so that finally the detector 30 detects the reflected light beam 32. Therefore, movements of the suspended torsion balance 1 can be tracked in any allowed translational or rotational degree of freedom.

In another possible implementation interferometric position read-out can be used to detect the position of the torsion balance 1.

The first optical module 24 of the optical readout device has a similar function, but it generates a light beam which is directed onto the first mirror 10 (FIG. 1A) of the torsion balance 1.

The light beam fed to the fiber outcoupler 26 via the optical fiber 27 is modulated (chopped) by an acousto-optical modulator (AOM) with a predetermined modulation frequency. Further, the detector 30 generates an electrical measurement signal which is fed to a lock-in amplifier (not shown) via a bandpass filter (not shown). Sending the electrical measurement signal generated by the detector 30 to the same lock-in amplifier as the modulation frequency the light beam generates a DC (direct current) signal out of exactly one frequency component of the detected electrical measurement signal. Now one assumes that the electrical measurement signal contains a lot of disturbing influences with a variety of different frequency components. Therefore, the optical readout device comprises a bandpass filter (not shown) filtering the electrical measurement signal before its amplification by the lock-in amplifier. The bandpass filter comprises a centre frequency corresponding to the modulation frequency which supports the lock-in technique.

Further, FIG. 4 shows a Faraday cage 33 consisting of aluminium, which encases the torsion balance 1, so that the torsion balance 1 is shielded from electrostatic disturbances.

Figure 6:
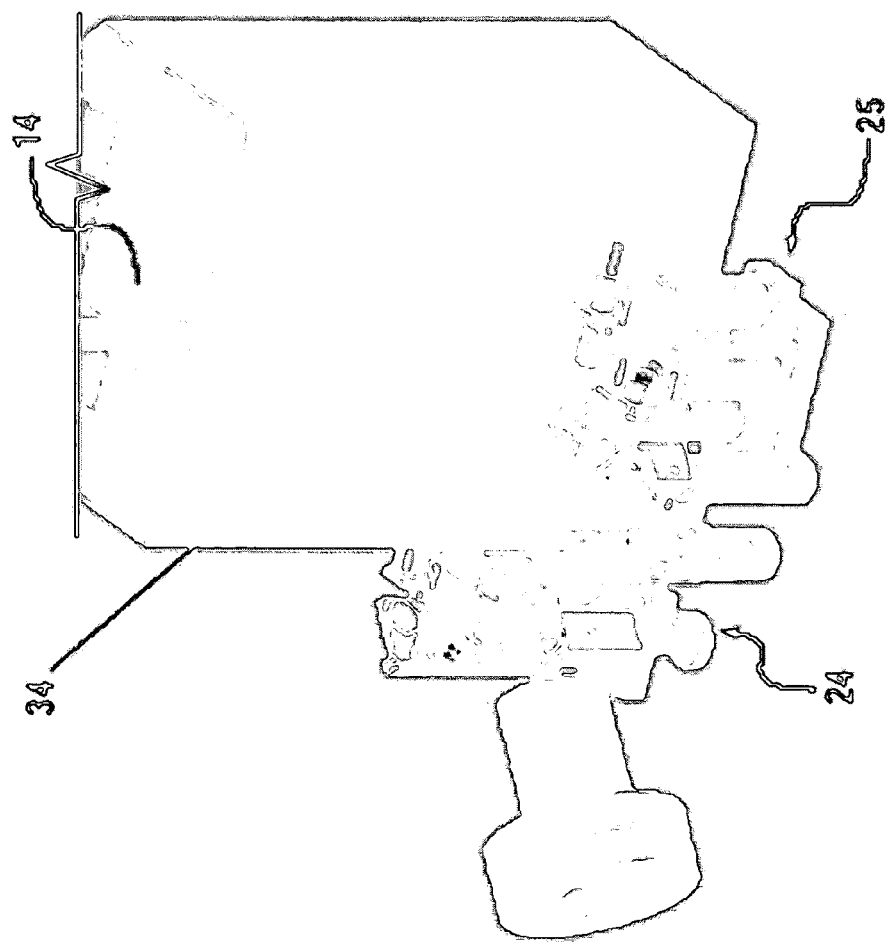
FIG. 6 is a perspective view showing a box shielding the torsion balance from electrostatic, magnetic and thermal disturbance.

Further, the entire apparatus apart from the first and second optical modules 24, 25 is encapsulated by a box 34 (see FIG. 6) which is covered by a so-called μ-metal foil with a high magnetic permeability, so that the box 34 shields the torsion balance 1 from magnetic disturbances.

Figure 7:
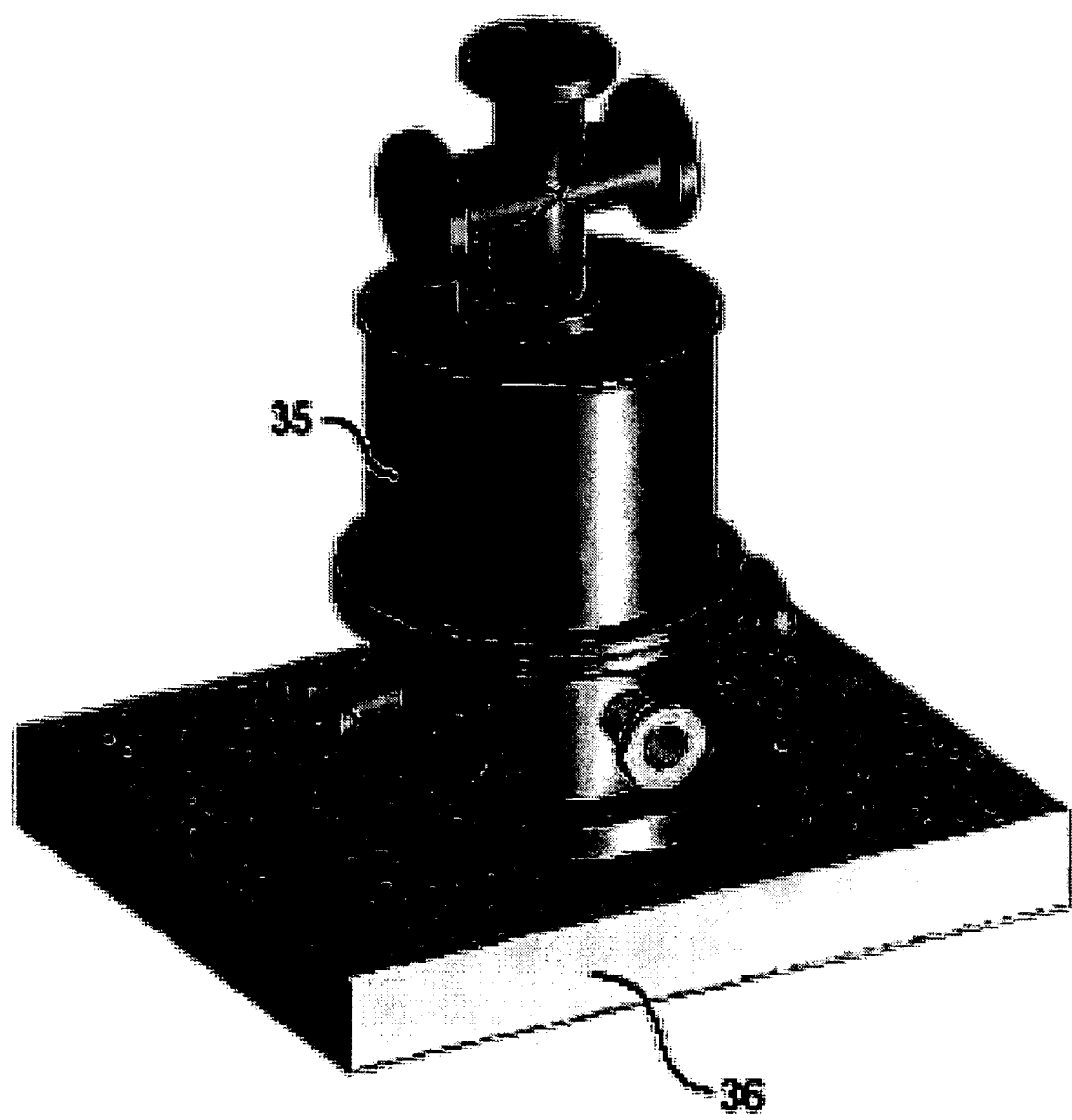
FIG. 7 is a perspective view showing a vacuum chamber containing the torsion balance.

Finally, FIG. 7 shows a vacuum housing 35 mounted on a base plate 36. The base plate 36 is actually the top part of a commercially available active vibration isolation board. The vacuum housing 35 encapsulates the entire apparatus mentioned above in order to reduce thermal gradients which may cause "winds" around the setup. The latter could lead to disturbances in the measured signal. The low pressure within the vacuum housing 35 is realized by use of a vibration free ion pump, while the disturbing magnetic field of the pump is reduced to a reasonable amount by the above mentioned μ-metal shield. In order to avoid mechanically transmitted vibrations from the surrounding of the setup, the complete system is mounted on top of an active vibration isolation system.

The actual measurement signal is given by the feedback voltage signal, which has to be applied to the first and second feedback electrodes 8, 9 in order to hold the torsion balance 1 in equilibrium.

A typical measurement cycle includes initial damping cycles to compensate for residual motion following adjustment. After that, the detection of rotational modes of the torsion balance 1 is possible.

The horizontal acceleration or gravity gradients, which act on the torsion balance 1 (precisely: the center of mass 12) can thus be detected with a very high precision. This is the result of the torsional suspension which is extremely sensitive to horizontal accelerations and allows for precise measurements.

Vertical accelerations or gravity gradients can be detected with lower precision. The related motion is a common swinging mode of the torsion wire 3, which is less sensitive than the torsional mode.

In total, any applied gravitational force acting on the torsion balance 1, can be decomposed into x-, y- and z-components, giving a true 3-dimensional torsional gravimeter.

Figure 8:
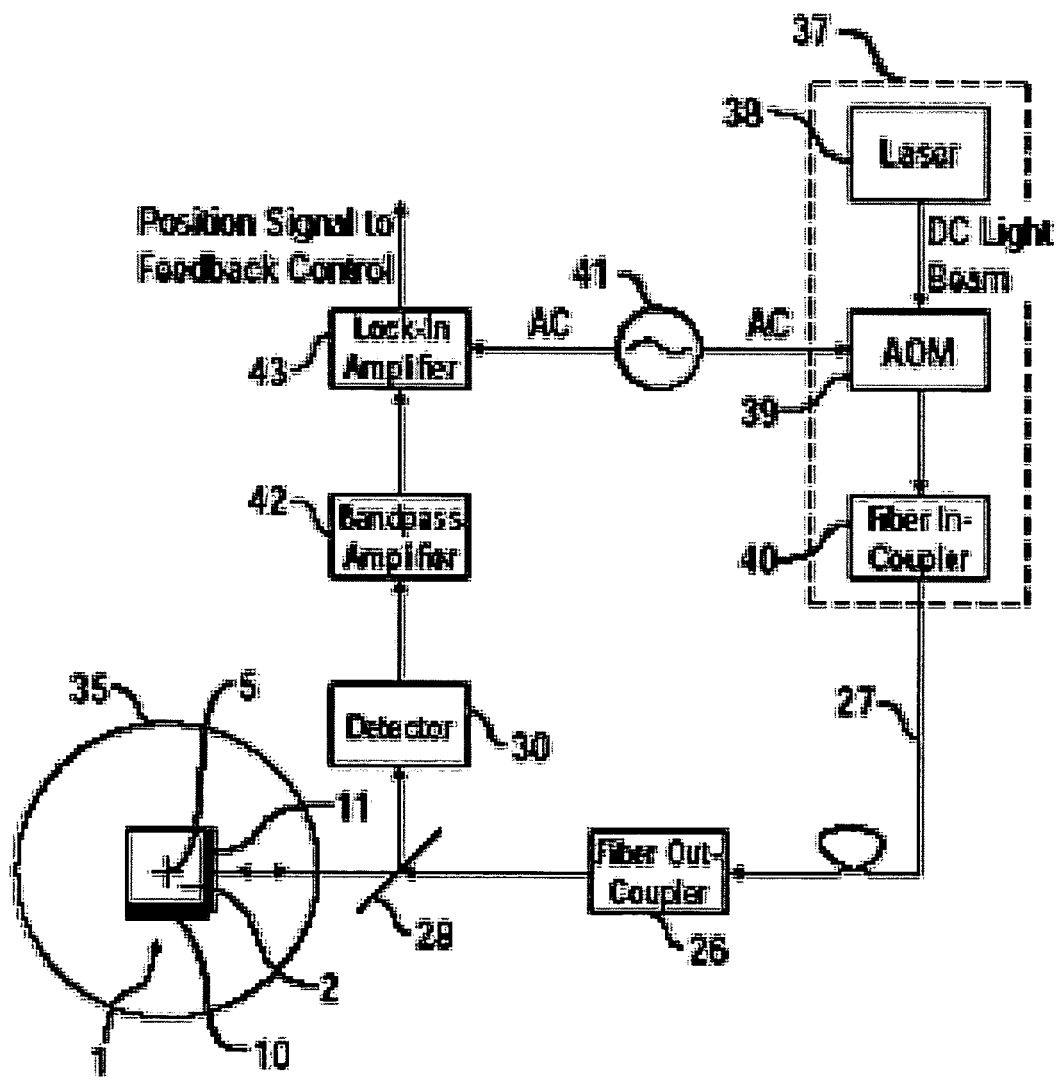
FIG. 8 is a schematic of the optical readout device of the gravimeter shown in FIGS. 1-7.

Finally, FIG. 8 shows a schematic of the optical readout device of the gravimeter described above.

Firstly, the optical readout device of the gravimeter comprises a stabilized light input system 37 including a laser 38, an acousto-optical modulator (AOM) 39 and a fiber in-coupler 40. The laser 38 generates a DC light beam, i.e. a CW beam (CW—Continuous wave), which is modulated by the acousto-optical modulator 39 with a modulation frequency generated by a frequency reference 41. In this embodiment, the modulation frequency is f=100 kHz. Thus, the acousto-optical modulator 39 generates an AC modulated light beam, which is fed to the fiber in-coupler 40. The fiber in-coupler 40 couples the AC modulated light beam into the fiber 27 shown in FIGS. 4 and 5.

Further, the optical readout device comprises a bandpass amplifier 42 having a centre frequency of 100 kHz, which corresponds to the modulation frequency generated by the frequency reference 41. Therefore, the bandpass filter 42 filters the electrical measurement signal generated by the detector 30, which supports the lock-in technique.

The bandpass filtered measurement signal is then fed to a lock-in amplifier 43, which also receives the modulation frequency f=100 kHz from the frequency reference 41. Thus, the lock-in amplifier 43 generates a position signal indicating the angular position of the torsion balance 1 with regard to the rotation axis 5.

TABLE 1

Index of Reference Numerals

| | |
|---|---|
| 1 | Torsion balance |
| 2 | Rod |
| 3 | Torsion wire |
| 4 | Top of the rod |
| 5 | Rotation axis |
| 6 | Stick |
| 7 | Test mass |
| 8 | First feedback electrode |
| 9 | Second feedback electrodes |
| 10 | First mirror |
| 11 | Second mirror |
| 12 | Center of mass |
| 13 | Base |
| 14 | Column |
| 15 | Arm |
| 16 | First capacitor |
| 17 | Upper part of the housing |
| 18 | Lower part of the housing |
| 19-22 | Second capacitors |
| 23 | Base plate |
| 24 | First optical module |
| 25 | Second optical module |
| 26 | Fiber outcoupler |
| 27 | Optical fiber |
| 28 | Beamsplitter cube |
| 29 | Mirror |
| 30 | Detector |
| 31 | Base plate |
| 32 | Light beam |
| 33 | Faraday cage |
| 34 | Box |
| 35 | Vacuum housing |

TABLE 1-continued

Index of Reference Numerals

| | |
|---|---|
| 36 | Base plate (antivibration device) |
| 37 | Stabilized light input system |
| 38 | Laser |
| 39 | Acousto-optical modulator |
| 40 | Fiber in-coupler |
| 41 | Frequency reference |
| 42 | Bandpass amplifier |
| 43 | Lock-in amplifier |

Although preferred embodiments of the invention have been described in detail, it will be readily appreciated by those skilled in the art that further modifications, alterations and additions to the invention embodiments disclosed may be made without departure from the spirit and scope of the invention as set forth in the appended claims. For example, the acousto-optical modulator 39 may be replaced by an electro-optical modulator or a chopper without departing from the invention.

We claim:

1. In a gravity measurement apparatus comprising a torsion balance bearing a test mass, said torsion balance having a predetermined center of mass and being rotatable around a predetermined rotation axis: the improvement in the gravity measurement apparatus comprising a feedback device for applying a feedback force to the torsion balance, the torsion balance being asymmetric, whereby the center of mass of the torsion balance is offset relative to the rotation axis of the torsion balance.

2. The gravity measurement apparatus according to claim 1, further comprising an optical readout device for detecting the angular position of the torsion balance.

3. The gravity measurement apparatus according to claim 2, wherein the optical readout device comprises a first mirror and a second mirror, said first mirror and said second mirror being attached to the torsion balance and being aligned substantially perpendicular to each other and substantially parallel to the rotation axis.

4. The gravity measurement apparatus according to claim 3, wherein the optical readout device comprises:
   a first light source directing a first light beam onto the first mirror,
   a first light detector detecting the first light beam after its reflection by the first mirror,
   a second light source directing a second light beam onto the second mirror,
   a second light detector detecting the second light beam after its reflection by the second mirror.

5. The gravity measurement apparatus according to claim 4, wherein the optical readout device comprises:
   a frequency reference providing a modulation frequency,
   a modulator for modulating at least one of the first and second light beams with the modulation frequency provided by the frequency reference,
   at least one lock-in amplifier receiving the modulation frequency from the frequency reference and an electrical measurement signal generated by at least one of the first and second light detectors detecting the at least one of the first and second light beams.

6. The gravity measurement apparatus according to claim 5, wherein the modulator is selected from a group consisting of:
   an acousto-optical modulator,
   an electro-optical modulator,
   a chopper.

7. The gravity measurement apparatus according to claim 4, wherein the optical readout device comprises a bandpass filter between each of the first and second light detectors and each of a pair of lock-in amplifiers connected to receive modulation frequency from a frequency reference and, via the bandpass filter, an electrical measurement signal generated by a one of the first and second light detectors, said bandpass filter filtering the electrical measurement signal generated by the first and second light detectors.

8. The gravity measurement apparatus according to claim 1, wherein the feedback device is an electrostatic feedback device for applying an electrostatic feedback force to the torsion balance.

9. The gravity measurement apparatus according to claim 8, wherein the electrostatic feedback device comprises at least a first feedback electrode attached to the torsion balance opposite the test mass for applying the electrostatic feed back force to the torsion balance.

10. The gravity measurement apparatus according to claim 9, wherein the first feedback electrode is substantially flat and aligned substantially perpendicular to the rotation axis of the torsion balance.

11. The gravity measurement apparatus according to claim 10, wherein the electrostatic feedback device comprises a set of second feedback electrodes attached to the torsion balance, said second feedback electrodes being substantially flat and aligned substantially perpendicular to each other and substantially parallel to the rotation axis of the torsion balance.

12. The gravity measurement apparatus according to claim 11, wherein the first feedback electrode and the second feedback electrodes each extend into a capacitor, said capacitor applying the electrical feedback force to the first feedback electrode and to the second feedback electrodes.

13. The gravity measurement apparatus according to claim 11, wherein the first feedback electrode and the second feedback electrodes at least partially consist of plates which are at least partially electrically conductive.

14. The gravity measurement apparatus according to claim 13, wherein the plates are covered with an electrically conductive material.

15. The gravity measurement apparatus according to claim 1, wherein the torsion balance is disposed within a vacuum chamber.

16. The gravity measurement apparatus according to claim 1, wherein the torsion balance is suspended from a supporting torsion member.

17. The gravity measurement apparatus according to claim 16, wherein the supporting torsion member is a torsion wire.

18. The gravity measurement apparatus according to claim 17, wherein the torsion wire consists of a material selected from a group consisting of:
   tungsten,
   silver,
   copper,
   platinum,
   iridium, and
   quartz with a metal coating.

19. The gravity measurement apparatus according to claim 17, wherein the torsion wire has a diameter between about 5 μm and about 50 μm.

20. The gravity measurement apparatus according to claim 17, further comprising:

a first structure being aligned substantially coaxially with the rotation axis and being suspended from the torsion wire, a secondary structure bearing the test mass and a first feedback electrode, said secondary structure being attached to the main structure and being aligned substantially perpendicular to the rotation axis.

21. The gravity measurement apparatus according to claim 20, wherein the first main structure consists of an electrically conductive material.

22. The gravity measurement apparatus according to claim 1, further comprising a Faraday cage shielding the torsion balance at least partially from electrostatic disturbances.

23. The gravity measurement apparatus according to claim 1, further comprising a magnetic cage shielding the torsion balance at least partially from magnetic disturbances.

24. The gravity measurement apparatus according to claim 1, further comprising a thermal insulation shielding the torsion balance at least partially from thermal disturbances.

* * * * *